United States Patent
Stob et al.

(10) Patent No.: US 8,240,517 B1
(45) Date of Patent: Aug. 14, 2012

(54) PORTABLE HAND-SANITIZING KIOSK

(76) Inventors: David J Stob, Placida, FL (US); Keith Haluska, Bradenton, FL (US)

(*) Notice: Subject to any disclaimer, the term of this patent is extended or adjusted under 35 U.S.C. 154(b) by 736 days.

(21) Appl. No.: 12/378,252

(22) Filed: Feb. 11, 2009

Related U.S. Application Data

(63) Continuation-in-part of application No. 12/231,084, filed on Aug. 29, 2008, now abandoned.

(51) Int. Cl.
*B67D 5/64* (2006.01)

(52) U.S. Cl. .................. 222/173; 222/52; 222/608

(58) Field of Classification Search .............. 222/608, 222/63, 52, 333, 372, 639, 173, 23; 40/312, 40/538, 447, 427
See application file for complete search history.

(56) References Cited

U.S. PATENT DOCUMENTS

| | | | | |
|---|---|---|---|---|
| 1,358,937 A * | 11/1920 | Curliss | ............................... | 4/626 |
| 2,446,109 A * | 7/1948 | Scarry | ............................... | 222/63 |
| 4,765,003 A * | 8/1988 | Chang | ............................... | 4/624 |
| 4,769,863 A * | 9/1988 | Tegg et al. | ............................... | 4/625 |
| 4,942,631 A * | 7/1990 | Rosa | ............................... | 4/623 |
| 5,199,118 A * | 4/1993 | Cole et al. | ............................... | 4/619 |
| 5,522,411 A * | 6/1996 | Johnson | ............................... | 134/95.2 |
| 5,992,430 A * | 11/1999 | Chardack et al. | ............................... | 134/115 G |
| 6,375,038 B1 * | 4/2002 | Daansen et al. | ............................... | 222/52 |
| 6,711,757 B2 * | 3/2004 | Peck | ............................... | 4/516 |
| 7,015,816 B2 * | 3/2006 | Wildman et al. | ............................... | 340/573.1 |
| 7,757,908 B1 * | 7/2010 | Buhl, Jr. | ............................... | 222/608 |
| 2003/0136797 A1 * | 7/2003 | Thomason | ............................... | 222/1 |
| 2007/0289987 A1 * | 12/2007 | Tramontina et al. | ............................... | 221/96 |
| 2009/0140004 A1 * | 6/2009 | Scorgie | ............................... | 222/52 |
| 2009/0178217 A1 * | 7/2009 | Reiter et al. | ............................... | 15/104.92 |
| 2011/0068930 A1 * | 3/2011 | Wildman et al. | ............................... | 340/573.1 |

* cited by examiner

*Primary Examiner* — Kevin P Shaver
*Assistant Examiner* — Donnell Long
(74) *Attorney, Agent, or Firm* — Richard K Thomson

(57) ABSTRACT

A elongated rectangular kiosk with a floor-engaging portion is equipped with a handle and wheels adjacent a rear surface to facilitate is mobility. A sink-like region has a faucet-like dispenser from which waterless sanitizer is dispensed in response to a motion sensor. Electrical power is provided by a lithium storage battery which is recharged by a solar panel. A wireless receiver/transmitter communicates with a remote base computer to control and monitor the operation of the kiosk. Informational displays, both video and placard, can be accommodated and a business card dispenser provided.

15 Claims, 6 Drawing Sheets

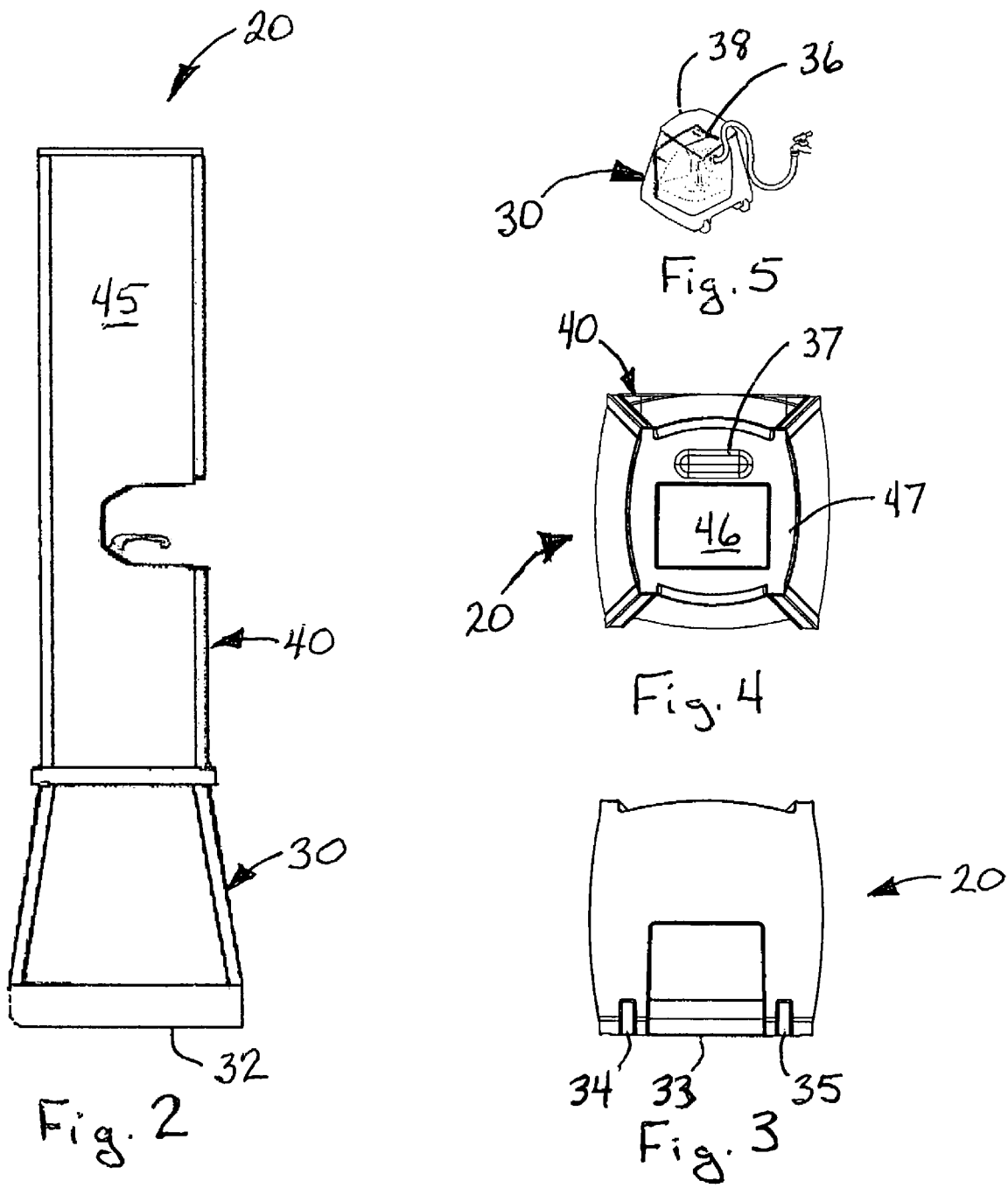

PORTABLE HAND-SANITIZING KIOSK

This application is a continuation-in-part of application Ser. No. 12/231,084 filed Aug. 29, 2008, now abandoned.

BACKGROUND AND SUMMARY OF THE INVENTION

The present invention is directed to personal hygiene. More particularly, the present invention is directed to a hand-sanitizing kiosk that can be easily moved from place to place.

As more and more medical information becomes available regarding the mechanism of transmission of various diseases from hand to mouth/nasal region, people are being made aware of the importance of sanitizing their hands as a disease avoidance technique. In addition, in restaurants, particularly those featuring buffet tables, it is advantageous for not only the employees, but the patrons, to have ready access to means to sanitize their hands prior to accessing the food table.

It is an object of the present invention to provide a portable hand-sanitizing kiosk that can be readily moved from place to place, yet is stable, has a pleasant appearance, yet is also functional. The hand-sanitizing kiosk of the present invention includes a) a vertical support structure including a floor-engaging portion and a station from which a waterless cleanser is dispensed; b) a dispenser for delivering a quantity of waterless hand cleanser to the station. The station comprises a recess positioned waist high, the recess resembling a sink with a faucet. The dispenser includes a container for the waterless cleanser, a pump for delivering the waterless cleanser from the container to the faucet in the recess, and a storage battery for powering the pump. Support means is provided, preferably a plurality of wheels, beneath the floor-engaging portion for facilitating movement of the kiosk. At least a portion of the plurality of wheels are positioned adjacent a rear edge of the floor-engaging portion and a handle situated at a top rear portion above the at least a portion of the plurality of wheels, enabling the portable hand-sanitizing kiosk to be rocked backward onto the at least a portion of the plurality of wheels, hand-dolly style, for transport.

Preferably, a solar collector is provided for recharging the storage battery. A motion sensor is associated with the faucet for activating the pump to deliver a measured quantity of the waterless cleanser through the faucet. Also included are a plurality of sensors for gathering data by monitoring a) levels of the waterless cleanser in the container; b) power levels in the storage battery; c) regulatory compliance information relating to time and number of activations of the motion sensor; d) location of the portable hand-sanitizing kiosk. Wireless transmission means is provided to transmit the data to a remote computer server. Wireless receiving means enables the computer server to remotely adjust operation of the portable hand-sanitizing kiosk.

The kiosk includes substantially flat regions located on exterior surface portions of the rectangular body of the kiosk to mount graphic displays. These graphic displays are selected from a group consisting of a) regulatory-compliant tutorials on the use of the kiosk; b) advertising; c) informational blurbs. The displays are preferably presented on an LCD.

Various other features, advantages, and characteristics of the present invention will become apparent after a reading of the following detailed description.

BRIEF DESCRIPTION OF THE DRAWINGS

The preferred embodiments of the present invention are described in conjunction with the associated drawings in which like features are indicated with like reference numerals and in which

FIG. 2 is a side view of the first embodiment;

FIG. 3 is a bottom view of the first embodiment;

FIG. 4 is a top view of the first embodiment;

FIG. 5 schematic depiction of the base receiving ballast;

DETAILED DESCRIPTION OF THE PREFERRED EMBODIMENT(S)

Figure 1:
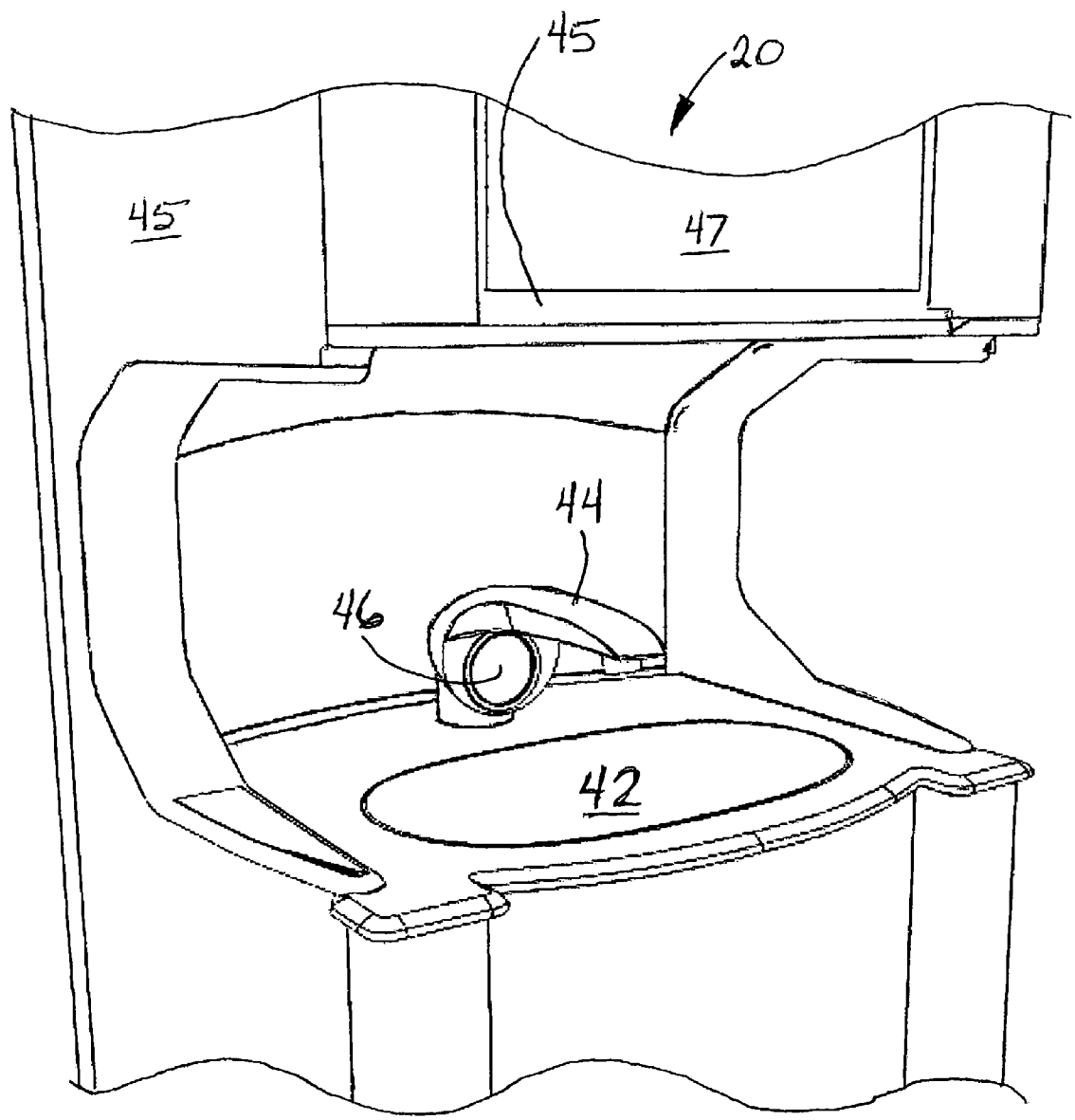
FIG. 1 is a schematic enlarged front view of a first embodiment of the portable hand-sanitizing kiosk of the present invention.
Figure 6A:
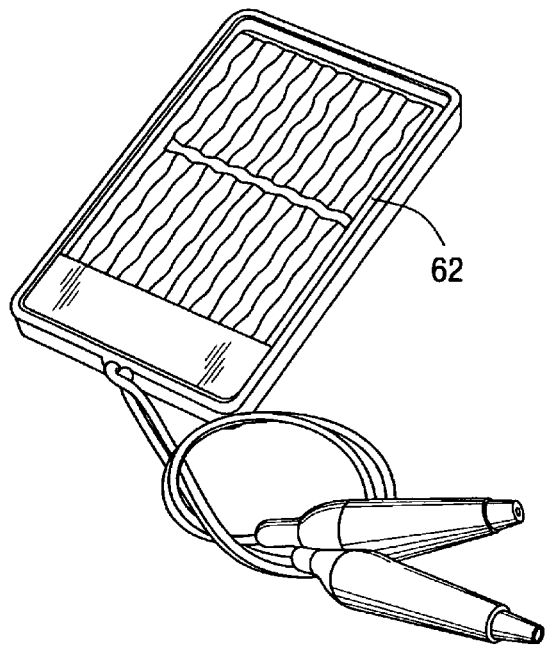
FIG. 6A is a perspective view of a solar cell used with the first embodiment.
Figure 6D:
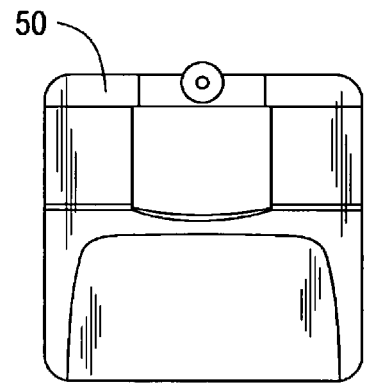
FIG. 6D is a perspective view of a motion sensor light useful with the first embodiment.
Figure 7:
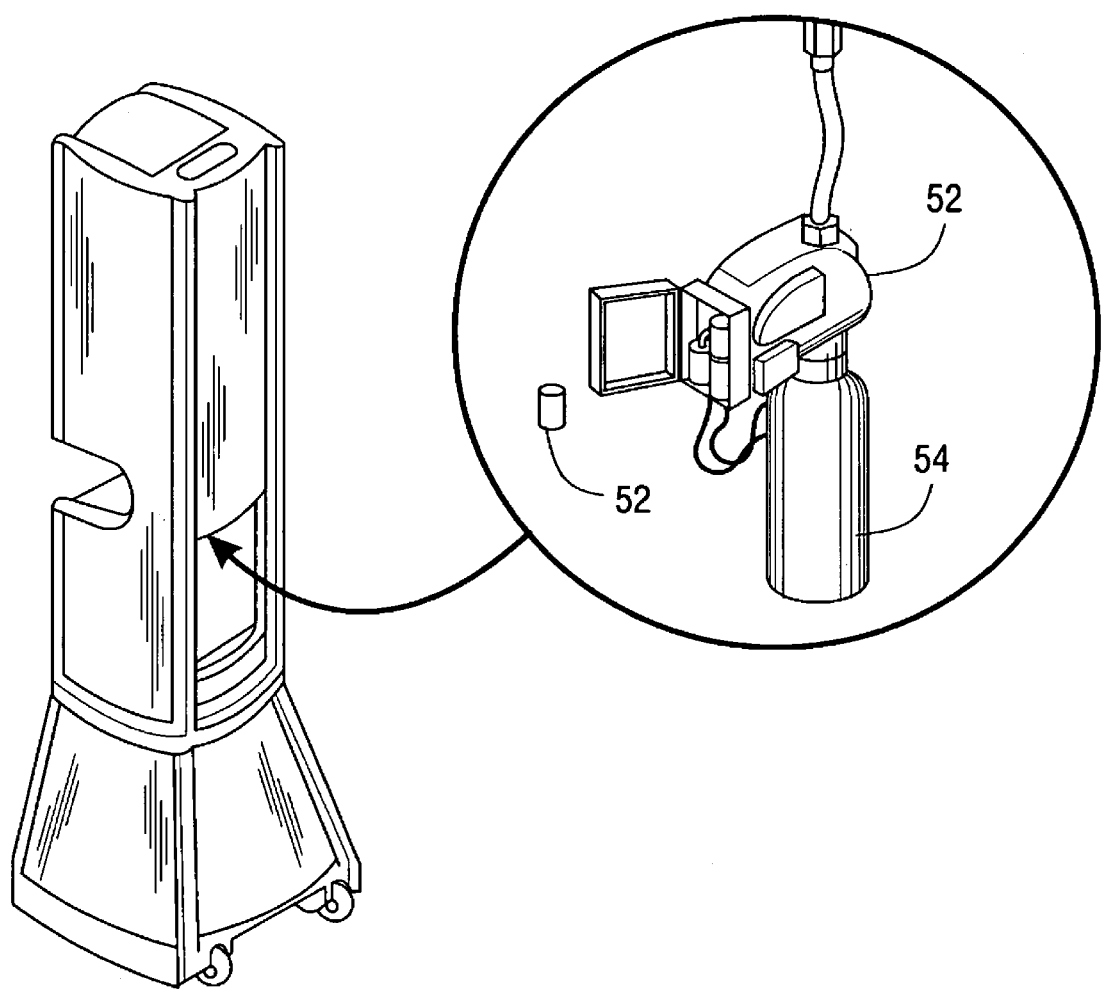
FIG. 7 is a schematic rear view with the operational equipment shown in the detail.

A first embodiment of the hand-sanitizing kiosk of the present invention is depicted in FIGS. 1-4 generally at 20. Kiosk 20 comprises a vertical support structure which includes a base 30 (FIG. 2) and an elongated rectangular body 40 which is attached thereto and sits on top of the base 30. Base 30 has a floor-engaging portion 32 and a support means in the form of a plurality of wheels 34, 35 (FIG. 3), at least two of which are positioned adjacent rear edge 33 of floor-engaging portion 32. Handle 37 is situated on a top 47 of kiosk 20 directly above wheels 34, 35 (FIG. 4) to enable the kiosk to be rocked back onto the wheels hand-dolly style, making it easily portable. Both the base 30 and body 40 are made of a light-weight, durable plastic material and, accordingly, to provide the kiosk 20 with stability, an inflatable plastic jug 36 is inserted through the open top 38 of base 30 and filled with water as shown in FIG. 5. Body 40 of kiosk 20 has a station from which waterless sanitizer is dispensed comprised of a central sink-like area 42 with a faucet-like member 44. The unit's dispenser is comprised of pump 52 and a supply container 54 (FIG. 7). A motion sensor light 50 of the type shown in FIG. 6D is positioned behind viewport 46 to activate pump 52 which dispenses waterless hand cleanser from container 54 for receipt beneath faucet-like member 44. Waterless hand cleanser may take the form of a lotion, gel, foam, spray or hand wipe without departing from the scope of the invention.

Figure 6B:
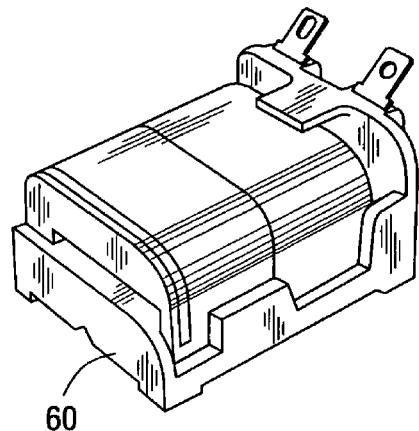
FIG. 6B is a perspective view of a storage battery which can be used.

A rechargeable lithium battery pack 60 of the type shown in FIG. 6B most preferably powers the pump 52, as well as all the sensors utilized in the system. A less desirable alternative is to use replaceable batteries 53 of the type shown in FIG. 7. However, in the preferred embodiment, a solar panel 62 of the type shown in FIG. 6A is situated in a recess 46 on the top 47 of the body 40 to recharge lithium battery pack 60. Solar panel 62 is most preferably of the type that converts natural or artificial light to energy such that the solar panel 62 and battery pack 60 are designed to provide the energy needs of the kiosk 20 throughout its useful life. Obviously, both the solar panel 62 and battery pack 60 can be readily changed, if necessary.

Figure 6C:
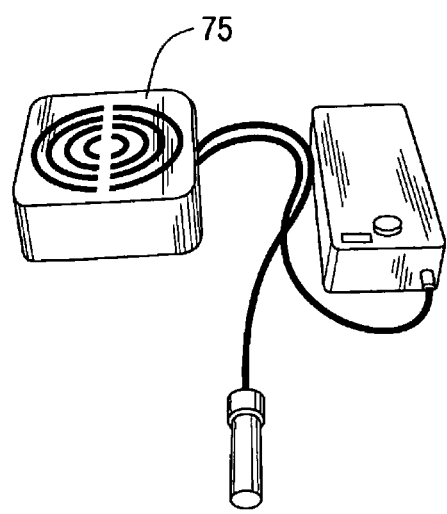
FIG. 6C is a perspective view of a voice activation unit of a type which may be used.

Flat regions 45 are positioned on sides of the kiosk 20 including one immediately above station 42 which receives graphic displays, such as LCD screen 47. Graphic displays may include a) regulatory-compliant tutorials on the use of the kiosk; b) advertising; c) informational blurbs regarding the rules of the establishment, for example. The LCD screen 47 can be designed to provide the informational tutorial on the use/operation of the kiosk 20 that may be voice activated by installing a voice activation module 75 of the type depicted in FIG. 6C.

Figure 8:
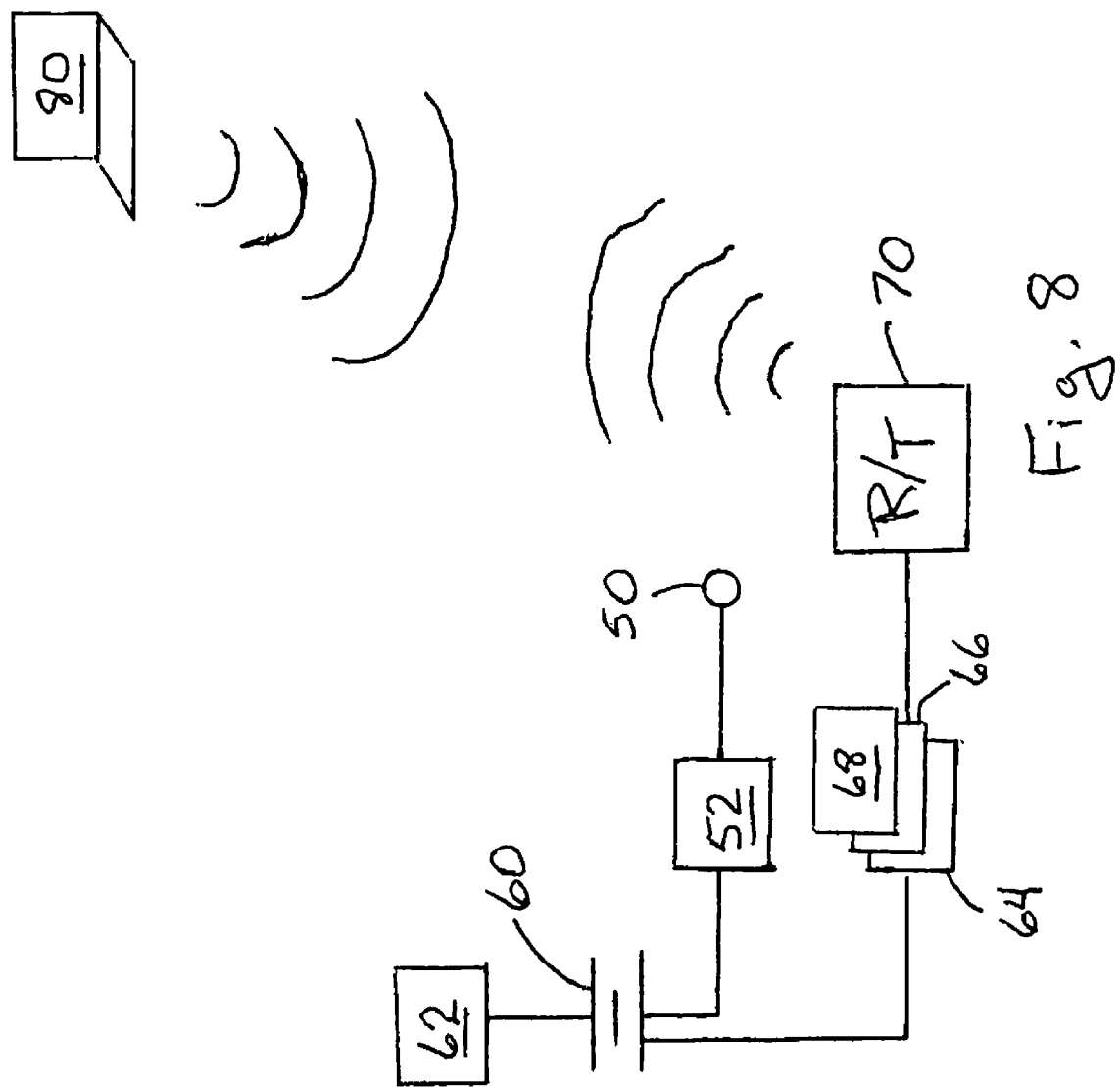
FIG. 8 is a schematic electrical diagram showing the interconnections of the elements.

A schematic electrical diagram is shown in FIG. 8. Solar panel 62 re-energizes battery pack 60 that powers pump 52 in response to motion sensor light 50. In addition, battery pack 60 supplies the power needs of cleanser level sensor 64, timing and number of activations sensor 66, and position sensor 68 which preferably comprises a GPS sensor. The time and number of activations sensor 66 is required for regulatory compliance within certain establishments, particularly food handling operations such as restaurants. The sensor information is fed to a wireless receiver/transmitter 70, shown here as a single unit, which relays the data to a remote base computer 80. Information may be transmitted from the computer 80 to the receiver/transmitter 70 to control the amount of sanitizer dispensed for each activation.

Figure 9:
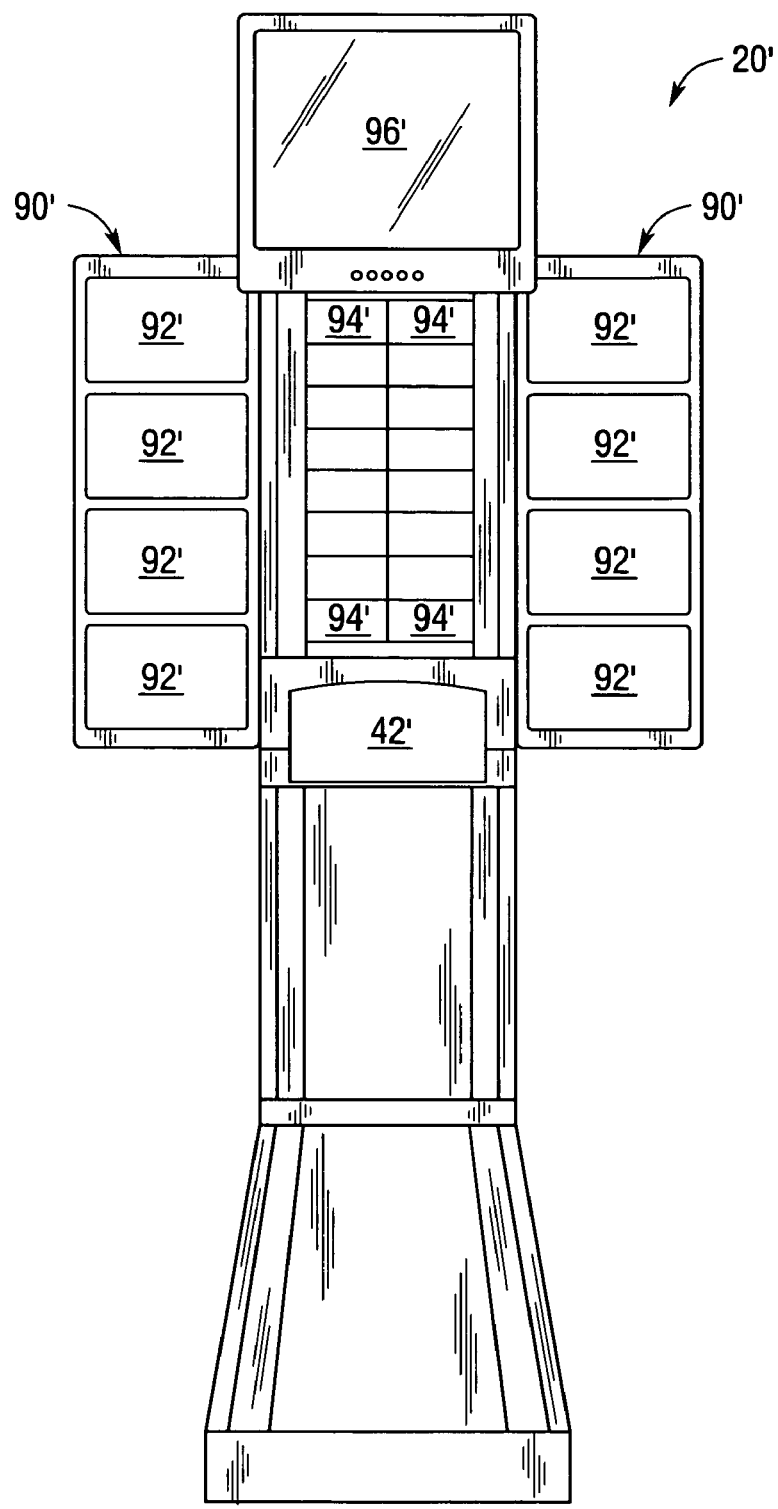
FIG. 9 is a front view of a second embodiment of the kiosk of the present invention.

A second embodiment of the hand-sanitizing kiosk of the present invention is depicted in FIG. 9 generally at 20'. Second embodiment 20', in addition to performing the primary function of dispensing hand cleanser from sink region 42', optionally, has two laterally protruding wings 90' with a plurality of compartments 92' to receive advertising/informational placards. The center section beneath video monitor 96', has a plurality of sleeves 94' with a clear vinyl windows to display/dispense business cards. Space afforded by compartments 92' and sleeves 94' can be rented by the owner of kiosk 20' to those wishing to advertise on/distribute business cards from the hand-sanitizing kiosk 20'. Monitor 96' may constitute a TV monitor which may feature closed circuit ads, informational videos on the proper use of kiosk 20', or any other desired materials.

The portable hand-sanitizing kiosk 20 of the present invention addresses the sanitation needs of a plurality of industries. The light-weight plastic from which it is made facilitates shipping and affords the capability of manufacturing the unit 20 in a variety of colors and finishes including some having a stone appearance. In addition, kiosk 20 is highly durable with electronics which should last the life of the unit and/or be easily changed out with replacement parts.

Various changes, alternatives, and modifications will become apparent to a person of ordinary skill in the art after a reading of the foregoing specification. It is intended that all such changes, alternatives, and modifications as fall within the scope of the appended claims be considered part of the present invention.

We claim:

1. A portable hand-sanitizing kiosk comprising
   a) an elongated rectangular body, said body including a floor engaging portion and a waist-high recess resembling a sink;
   b) a dispenser for delivering a quantity of waterless hand cleanser, said dispenser including a container for said waterless cleanser, a pump for delivering said waterless cleanser from said container to said recess, and a battery for powering said pump;
   c) vertically extending substantially flat regions located on exterior surface portions of an upper portion of said rectangular body to mount graphic displays, wherein at least some of said substantially flat regions are located on a plurality of laterally protruding wings which extend in opposite lateral directions from said upper portion of said rectangular body, each of said plurality of laterally protruding wings having a plurality of compartments.

2. The portable hand-sanitizing kiosk of claim 1 wherein said graphic displays are selected from a group consisting of a) regulatory-compliant tutorials on the use of said kiosk; b) advertising placards; c) informational blurbs; d) business cards; e) video broadcasts.

3. The portable hand-sanitizing kiosk of claim 1 wherein said graphic displays are presented on a video monitor.

4. The portable hand-sanitizing kiosk of claim 1 further comprising a plurality of wheels mounted adjacent a lower rear edge of said floor-engaging portion to facilitate transport of said portable hand-sanitizing kiosk.

5. The portable hand-sanitizing kiosk of claim 4 further comprising a handle situated at a top rear portion above said plurality of wheels enabling said portable hand-sanitizing kiosk to be rocked backward onto said plurality of wheels hand-dolly style for transport.

6. The portable hand-sanitizing kiosk of claim 1 further comprising sensors for gathering data by monitoring a) levels of said waterless cleanser in said container; b) power levels in said storage battery; c) regulatory compliance information relating to time and number of activations of said motion sensor; d) location of said portable hand-sanitizing kiosk.

7. The portable hand-sanitizing kiosk of claim 1 further comprising wireless transmission means to transmit said data to a computer server and wireless receiving means enabling the computer server to remotely adjust operation of said portable hand-sanitizing kiosk.

8. The portable hand-sanitizing kiosk of claim 2 wherein said flat regions of said laterally protruding wings have pockets which receive advertising placards and business cards.

9. A hand-sanitizing kiosk comprising
   a) a vertical support structure including a floor-engaging portion and a station from which a waterless hand cleansing means is dispensed;
   b) a dispenser for delivering the waterless hand cleansing means to said station;
   c) substantially flat regions located on exterior surface portions of said rectangular body to mount graphic displays, wherein said graphic displays are selected from a group consisting of a) regulatory-compliant tutorials on the use of said kiosk; b) advertising placards; c) informational blurbs; d) business cards; e) video broadcasts and wherein said substantially flat portions have a vertically extending display face and at least partially are positioned on wings which extend laterally outwardly from an upper portion of said kiosk in opposite lateral directions.

10. The portable hand-sanitizing kiosk of claim 9 wherein said graphic displays are located in pockets on said vertically extending display face and include advertising placards, informational blurbs, and business cards.

11. The hand-sanitizing kiosk of claim 9 wherein said station comprises a recess positioned waist high, said recess resembling a sink with a faucet.

12. The hand-sanitizing kiosk of claim 11 wherein said dispenser including a container for said hand cleansing means, a pump for delivering said waterless hand cleansing means from said container to said faucet in said recess, and a storage battery for powering said pump.

13. The hand-sanitizing kiosk of claim 9 further comprising support means beneath said floor engaging portion for facilitating movement of said portable hand-sanitizing kiosk.

14. The hand-sanitizing kiosk of claim 13 wherein said support means comprises a plurality of wheels.

15. The portable hand-sanitizing kiosk of claim 9 wherein said graphic displays are presented on a LCD.

* * * * *